(No Model.) 2 Sheets—Sheet 1.
C. B. ADAMS.
AERIAL CAMERA.
No. 510,759. Patented Dec. 12, 1893.
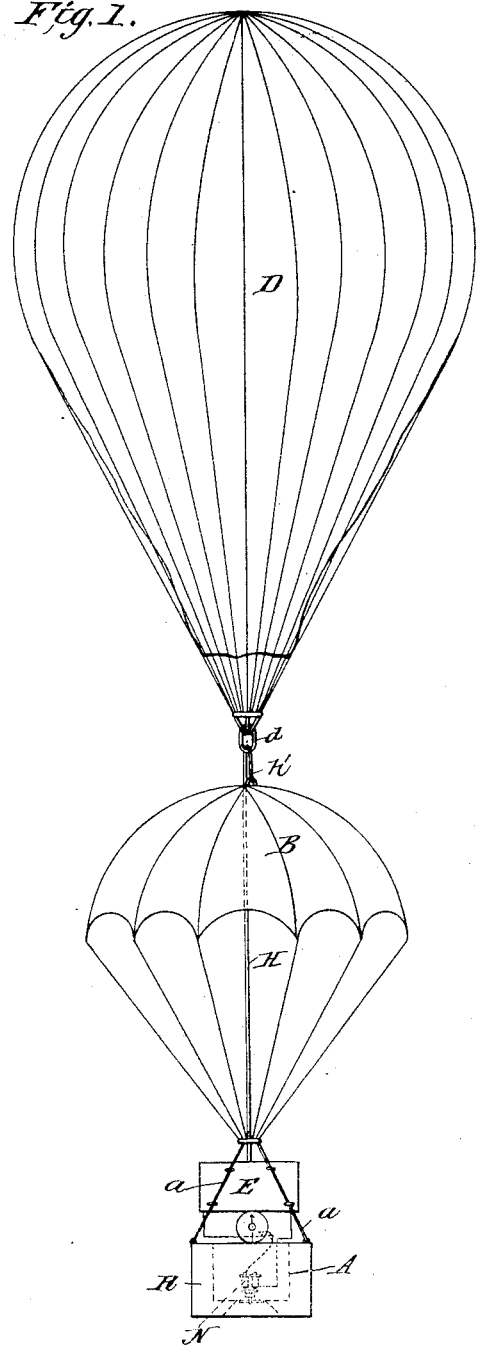
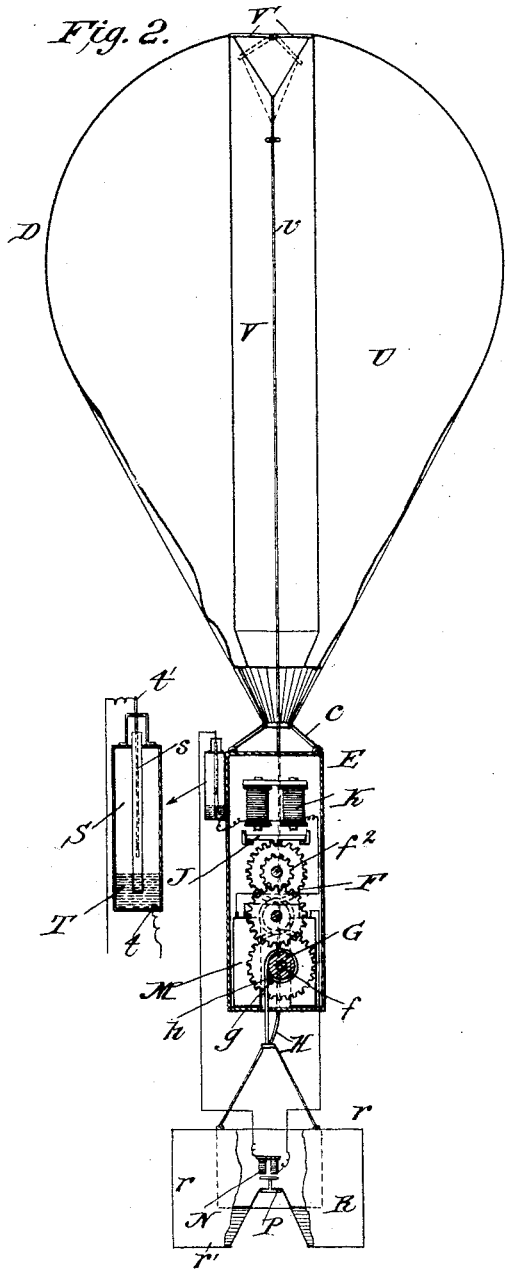
WITNESSES:
M. D. Blondel
Jos. A. Ryan
INVENTOR
Cornele B. Adams.
BY Munn & Co
ATTORNEYS.

(No Model.)  2 Sheets—Sheet 2.
C. B. ADAMS.
AERIAL CAMERA.
No. 510,759. Patented Dec. 12, 1893.
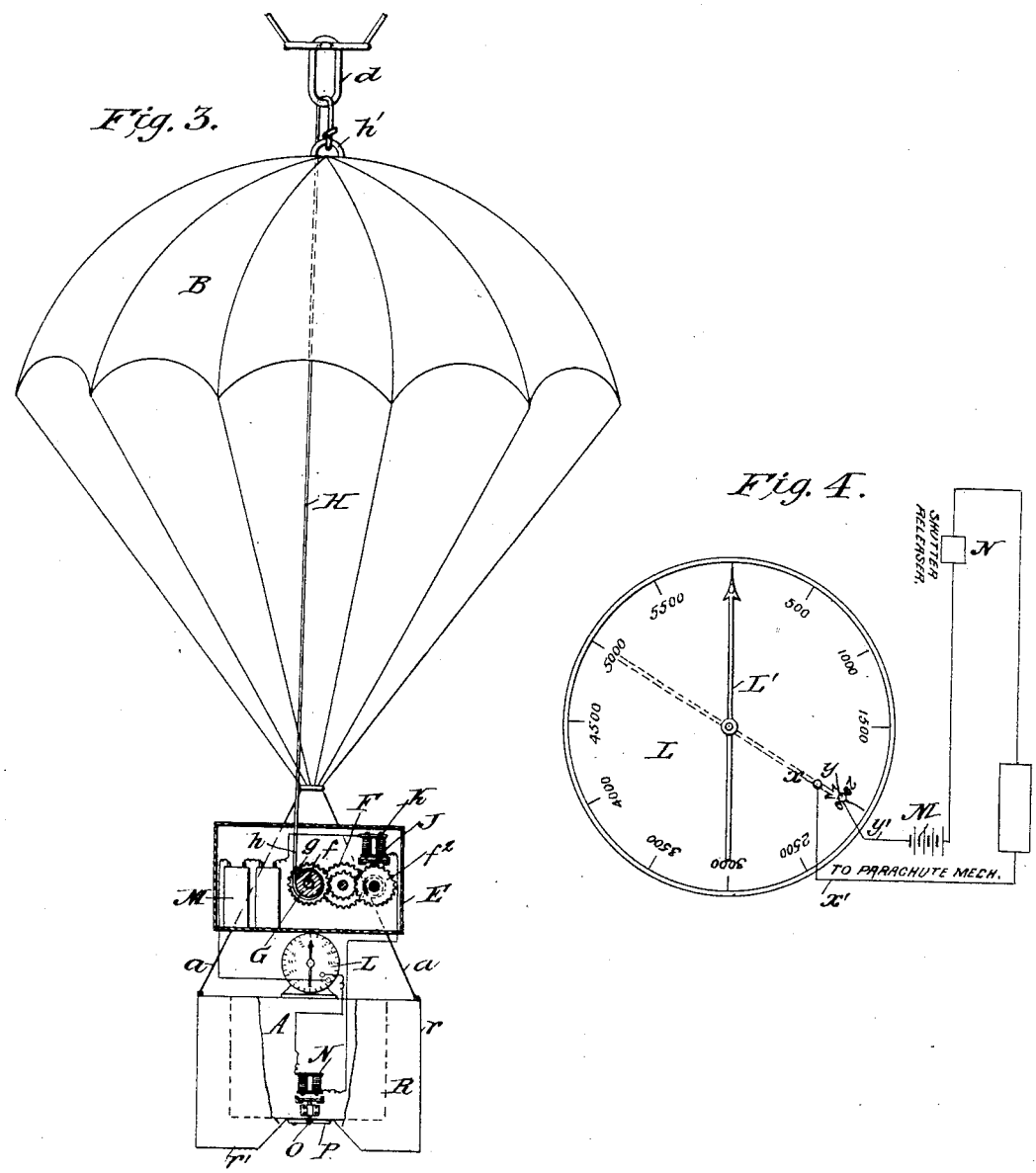
WITNESSES:
W. D. Blondel
Jos. A. Ryan
INVENTOR
Cornele B. Adams.
BY Munn & Co
ATTORNEYS.

UNITED STATES PATENT OFFICE.

CORNELE BERRIEN ADAMS, OF AUGUSTA, GEORGIA.

AERIAL CAMERA.

SPECIFICATION forming part of Letters Patent No. 510,759, dated December 12, 1893.

Application filed February 10, 1893. Serial No. 461,798. (No model.)

*To all whom it may concern:*

Be it known that I, CORNELE BERRIEN ADAMS, residing at Augusta, in the county of Richmond and State of Georgia, have invented a new and Improved Aerial Camera, of which the following is a specification.

My invention relates to balloon photography, and it refers more particularly to means for causing an automatic exposure at proper altitude, and a descent of the camera with the parachute or supporting balloon, after the exposure is made.

The invention consists in the peculiar combination and novel arrangement of parts, such as will hereinafter be fully described and claimed, reference being had to the accompanying drawings, in which—

Figure 1 is an elevation of an aerial camera, constructed in accordance with my invention. Fig. 2 is a similar view of a modified arrangement thereof. Fig. 3 is a detail view of the parachute releasing devices, and Fig. 4 is a diagrammatic view hereinafter particularly referred to.

In the practical construction of my improved aerial camera the several parts are so arranged that they are capable of adjustment to automatically operate to release the camera shutter, to make the exposure, when such camera reaches a predetermined height, and immediately thereafter to release such camera from the lifting balloon, or cause a sufficient amount of gas to escape from the balloon, whereby the balloon, the camera and its supporting devices will descend. This operation I preferably accomplish by the means best illustrated in Figs. 1 and 3 of the drawings, by reference to which it will be seen, that the camera A (which may be of any well known construction) is suspended from a parachute B, which in turn is detachably connected to the balloon proper D.

Mounted upon the camera, or secured to the camera supporting ropes $a\ a$ is a casing E, in which are located the parachute releasing devices, which consist of a train of differential gears F, upon the shaft of one $f$ of which is secured a drum G, having a radial stud or finger $g$.

H indicates the parachute supporting rope, which is connected to the top of the parachute, at $h'$, passes through the balloon ring $d$, extends down through the parachute, and has its lower end $h$, wound about the drum G and detachably connected with the stud $g$ as clearly shown in Fig. 3.

The gearing F is normally held locked by means of a detent J which engages the gear $f^2$ and which forms the armature bar of a magnet K.

L indicates an aneroid barometer, located on the top of the camera, upon the face of which are located terminal points $x\ y$ of the circuit wires $x'\ y'$ which connect with the battery M, and the magnet K.

Referring now more particularly to Fig. 4 of the drawings it will be noticed that in the electrical circuit is also located the shutter releasing mechanism, which in the present instance consists of a magnet N, adapted when energized to withdraw a detent O, which normally engages the shutter P to hold it from operation.

So far as described, it is manifest should the terminals $x$ and $y$ which are adapted to be set at any point on the barometer be placed at two thousand feet as shown in Fig. 4, the indicator arm L' would, when the camera reaches such an altitude, connect such terminals, close the electric circuit and operate the magnet N, to release the shutter detent O and allow it to momentarily pass from over the camera opening; at the same time the armature bar J would be drawn up from engagement with the gear $f^2$, and as it is thus released, the weight of the parachute, the camera, and operating mechanism will pull upon the rope H and thereby cause the drum G and gears F to rotate until the end $h$ of such rope pulls off the stud $g$. The parachute being thus released from the balloon, will gradually descend to the earth with the camera.

As before stated the camera may be of any well known construction. I prefer however to incase it in a chamber R, which extends over the sides as at $r$ and under the bottom as at $r'$, and such chamber is in the nature of a cushion chamber, the casing being in practice formed of some yielding or elastic material, held inflated or extended by means of air or springs.

In Fig. 2 I have shown a modified arrangement of my invention. In this instance, the parachute is dispensed with and the operating mechanism and the camera connected with the balloon proper, and such balloon is constructed to lose its lifting power, immediately after the exposure is made.

It will be observed by reference to Fig. 2 that the casing E is supported on the balloon ropes c c and the gear devices F mounted vertically therein, the gear f being at the lower end and provided with a drum G as before. The supporting rope H is however in this arrangement secured firmly to the said drum, at its upper end h', while its lower end supports the camera. Such upper end, is however wound one or more times about such drum as shown. When using the latter construction, I can dispense with the aneroid barometer, and use a barometer constructed substantially as shown in such Fig. 3, which consists of a chamber S, having a central tube s projected above the same and open at both ends, the lower end extending to near the bottom of the chamber S, and immersed in the mercury T held in the bottom of such chamber S. It should be stated, that in practice the chamber S, is filled above the mercury with air of ordinary or surface density, and as the air contained within such chamber equals the outside pressure, entering through the tube s the mercury will be held in the tube at a level with the mercury in the bottom of such chamber S.

t indicates one terminal in the bottom of the chamber S, and t' the other terminal which is adjustably held in the tube s. In operation, the terminal t' is first adjusted to the desired point in the tube s. Now as the outside air pressure decreases, it is obvious that the interior air pressure will cause the mercury to ascend in the tube, until it reaches the terminal t', which closes the circuit and operates to release the shutter and the gear devices F in the manner before described.

As previously stated, in this construction the balloon descends with the camera, and the operating devices. To this end I form the balloon with a main gas chamber U and a central or supplemental chamber V, the upper end of which is normally held closed by valves V' V' to which is connected a valve rope v. In practice the chamber U is of such a capacity that when filled with gas it will almost counterbalance or serve to lift the camera operating devices, but with the supplemental chamber filled it will readily rise. The valve rope v passes down and connects with the supporting rope H and normally hangs slack to permit the valves V' V' at the upper end of chamber V to remain closed. When however the gear mechanism F has been released, the weight of the camera will serve to unwind such of the rope as is coiled on the drum, and as it is drawn taut it (the rope H) will draw on the valve rope v and open the valves, and release the gas held in chamber V, thereby reducing the lifting power of the balloon sufficiently to allow for its gradual descent.

Having thus described my invention, what I claim, and desire to secure by Letters Patent, is—

1. An aerial camera, comprising an aerial supporting body provided with means for reducing its lifting power, a camera having an automatic shutter and suspended from said body, an electro mechanical means connected with the shutter and the means for reducing the lifting power of the said body, a barometer in the electrical circuit of the electro mechanical means and connected with the terminals thereof, and closing the circuit when the camera reaches a predetermined height, whereby the shutter will be operated and the lifting power of the supporting body reduced as and for the purposes set forth.

2. An aerial camera, comprising an aerial supporting body provided with means for reducing its lifting power, a camera having an automatically operated shutter, electro mechanical means arranged intermediate the body and camera, a barometer in the electrical circuit of such electro mechanical means connected with the terminals thereof and adapted to close the circuit through its varying movement, such means arranged substantially as shown, whereby when the camera reaches a predetermined height they will operate to first release the camera shutter and then operate the lift reducing means as and for the purposes described.

3. In an aerial camera, in combination, the aerial or supporting body, a camera suspended therefrom, having an automatically operated shutter, an electro mechanical detent arranged to normally hold the shutter closed, means for reducing the lifting power of the aerial body, disposed between the said body and the camera, and supported from such body, an electro mechanically operated detent for normally holding such means from operation, such means including an electric circuit connected with such detents, and a barometer, joining the terminals of such circuit, all arranged substantially as shown and for the purposes described.

4. In an aerial camera, a camera adapted to be supported from the balloon, having a cushion chamber at its sides and bottom, substantially as and for the purpose described.

5. In an aerial camera in combination, a balloon having valved outlets, a gear mechanism suspended therefrom, said mechanism including the drum G and the electro mechanical detent J, a cord wound about the drum at one end, the camera suspended from the free end of such cord, said camera having an automatically operated shutter, the cord H connected with the aforesaid cord, and the valves of the balloon outlets, and a barometer connecting the terminals of the wires of the electro mechanical detent J, all arranged substantially as shown and described.

6. An aerial camera, comprising the aerial supporting body, a camera suspended therefrom having an automatically operated shutter, a barometer, and connections between the barometer and shutter devices, arranged to be moved into operation to release the shutter when the barometer reaches a predetermined height substantially as and for the purposes described.

7. In an aerial camera, in combination, the balloon proper, a camera having an electro mechanically operated shutter, an electric circuit connected with such shutter devices and a barometer having adjustable terminal points for the terminals of such circuit substantially as and for the purposes described.

CORNELE BERRIEN ADAMS.

Witnesses:
SOLON C. KEMON,
AMOS W. HART.